United States Patent
Betz (10) Patent No.: US 10,597,006 B2
(45) Date of Patent: *Mar. 24, 2020

(54) PARKING ASSISTANCE SYSTEM

(71) Applicant: Darren Betz, Arnold, CA (US)

(72) Inventor: Darren Betz, Arnold, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/843,363

(22) Filed: Dec. 15, 2017

(65) Prior Publication Data

US 2019/0184948 A1 Jun. 20, 2019

(51) Int. Cl.
*B60S 9/215* (2006.01)
*B60S 11/00* (2006.01)
*B60S 9/22* (2006.01)

(52) U.S. Cl.
CPC ............. *B60S 9/215* (2013.01); *B60S 9/22* (2013.01); *B60S 11/00* (2013.01)

(58) Field of Classification Search
CPC .... B62D 15/027; B62D 15/0285; B60S 9/215
USPC ......................................................... 180/199
See application file for complete search history.

(56) References Cited

U.S. PATENT DOCUMENTS

| | | | | |
|---|---|---|---|---|
| 3,120,398 A | * | 2/1964 | Butterworth | B60S 9/20 180/199 |
| 3,216,703 A | * | 11/1965 | Walker | B60S 9/21 180/200 |
| 3,598,462 A | * | 8/1971 | Kanitz | A47B 63/06 292/96 |
| 4,516,653 A | * | 5/1985 | Walker | B60S 9/20 180/199 |
| 4,605,086 A | * | 8/1986 | Marom | B60S 9/215 180/202 |
| 4,834,206 A | * | 5/1989 | Ching-Tang | B60S 9/215 180/202 |
| 5,224,688 A | | 7/1993 | Torres | |
| 5,447,210 A | * | 9/1995 | Lai | B60S 9/215 180/202 |
| 6,913,248 B1 | | 7/2005 | Schmitz | |
| 6,991,221 B1 | | 1/2006 | Rodriguez | |
| 7,387,306 B2 | | 6/2008 | Zimmer | |
| 7,489,256 B2 | | 2/2009 | Dergounov | |
| 9,514,646 B2 | * | 12/2016 | Stefan | B60W 30/06 |
| 9,862,361 B2 | * | 1/2018 | Betz | B60S 9/215 |

* cited by examiner

*Primary Examiner* — Tony H Winner (57) ABSTRACT

A parking system for a vehicle provides a self-contained vehicle lift with jacks on wheels and mounted on a vehicle frame, wherein the jacks are operable between a retracted position permitting the vehicle to move in a normal fashion, and an extended position effective to raise the entire vehicle off the ground to allow the wheels move the vehicle into the parking position.

20 Claims, 9 Drawing Sheets

PARKING ASSISTANCE SYSTEM

FIELD OF THE INVENTION

The present invention relates to a system for assisting a vehicle operator to correctly parallel-park a vehicle.

BACKGROUND OF THE INVENTION

Parallel parking is a method of parking a vehicle in line with other parked cars. Cars parked in parallel are in one line, parallel to the curb, with the front bumper of each car facing the back bumper of an adjacent one. Since parallel parking is parallel to the curb of a road, roads that facilitate said parking have an extra lane or a large shoulder for parked cars. It is also employed anytime perpendicular parking facilities are not available or hard to come by commonly, that's in large metropolitan areas where there is a high density of vehicles and few (or restricted) accommodations such as parking garages.

Parallel parking is considered by many to be one of the hardest skills for new drivers to learn. Following are the typical steps for performing a parallel parking:

Signal into the space.
Ensure that the desired parking space is about 2 meters longer than the vehicle's length.
Line up the vehicle beside the vehicle in front of the parking space.
Turn the steering wheel one turn towards the curb and put the vehicle into reverse.
Back up the vehicle so that the rear bumper is first to enter the parking space.
Once the vehicle is at a certain angle such as 45° to the parking spot, slow down and turn the steering wheel all the way, to the road side.
Continue backing up until the vehicle is parallel with the curb.
Gradually turn the steering wheel towards the curb to curve the vehicle into a straight position.
Brake once the vehicle occupies the middle of the parking space.
Make sure that the vehicle is not parked too far from the curb.

Recognizing the problem of performing an accurate parallel parking car, manufacturers are trying to automate the parking process. For example, one car manufacturer recently disclosed an automated parking system. This system relies on a built-in computer, steering sensor and a tiny camera in the car's rear to park itself in a user specified region chosen with the arrows.

SUMMARY

Additional features and advantages of the present invention are described in, and will be apparent from, the following Detailed Description of the Invention and the figures.

In one aspect, a parking solution includes a jack coupled to a strut in the frame of a vehicle, the jack including a wheel for positioning the vehicle. Each jack has a jack wheel and mounted to a vehicle frame, wherein the jacks are operable between a retracted position permitting the vehicle to move in a normal fashion, and an extended position effective to raise the entire vehicle off the ground to allow the wheels move the vehicle into the parking position.

In another aspect, the parking system for the vehicle thus includes a vehicle lift with jacks each having a jack wheel and mounted to a vehicle frame, wherein the jacks are operable between a retracted position permitting the vehicle to move in a normal fashion, and an extended position effective to raise the entire vehicle off the ground to allow the wheels move the vehicle into the parking position, wherein the jack wheels can be locked to move only in predetermined direction, and automatic means for locking the jack's wheel in its extended position. The system includes a curb sensor to detect car position relative to a curb; a jack motor to drive the jack from the retracted position to the extended position; a jack wheel motor to drive the jack wheel to park the vehicle adjacent the curb; and a processor receiving the car position from the curb sensor, the processor controlling the jack motor to move the jack to the extended position, the processor further controlling the jack wheel motor to drive the jack wheel and park the vehicle. In one implementation, the jack is secured to a frame of the vehicle or a vehicle axle. In another implementation, the jack is an add-on kit for the vehicle or fabricated as an integrated unit of a vehicle.

Advantages of the preferred embodiment may include one or more of the following. The system provides a parking solution for a motor vehicle that allows the motorist to park a vehicle in a tight parking area, a dangerous area or during inclement weather in an easy and efficient manner. For repair shops, the solution can position a vehicle in a way that eliminates the need for cumbersome, difficult-to-use standard auto jacks. The system completely eliminates the messy process of manually jacking up a motor vehicle. The automatic parking system for a motor vehicle allows an elderly or handicapped individual to park the motor vehicle with ease. The system has non-parking uses as well, for example, it can be used as a jacking system for a motor vehicle that allows the individual to quickly and safely raise and lower the motor vehicle thereby facilitating the efficient process of changing a vehicle tire. The system can be automated so that a user can automatically raise the vehicle from a dashboard mounted control panel. The control can also be on the steering wheel, or alternatively in any suitable spot in the vehicle such as the door, the seat, the roof, among others. The parking assistance system can be safely operated by non-technical drivers, and the jacking units are of relatively compact size thereby avoiding the need for expensive and troublesome pivoting support assemblies. The driver can also use the system to perform a U-turn in a very tight spot to get out of a grid-lock or a parking lot if needed. The system can park the vehicle in very tight spots, thus allowing more parking spots to be available for parking purposes in the same parking lot.

The above brief description sets forth rather broadly the more important features of the present invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one preferred embodiment of the invention in detail, as required by statute, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention of the application, which only is measured by the claims, nor is it intended to be limiting as to the scope of the invention in any way.

BRIEF DESCRIPTION OF THE FIGURES

Exemplary embodiments of the invention are explained hereinbelow with reference to accompanying drawings, in which.

DETAILED DESCRIPTION

Figure 6:
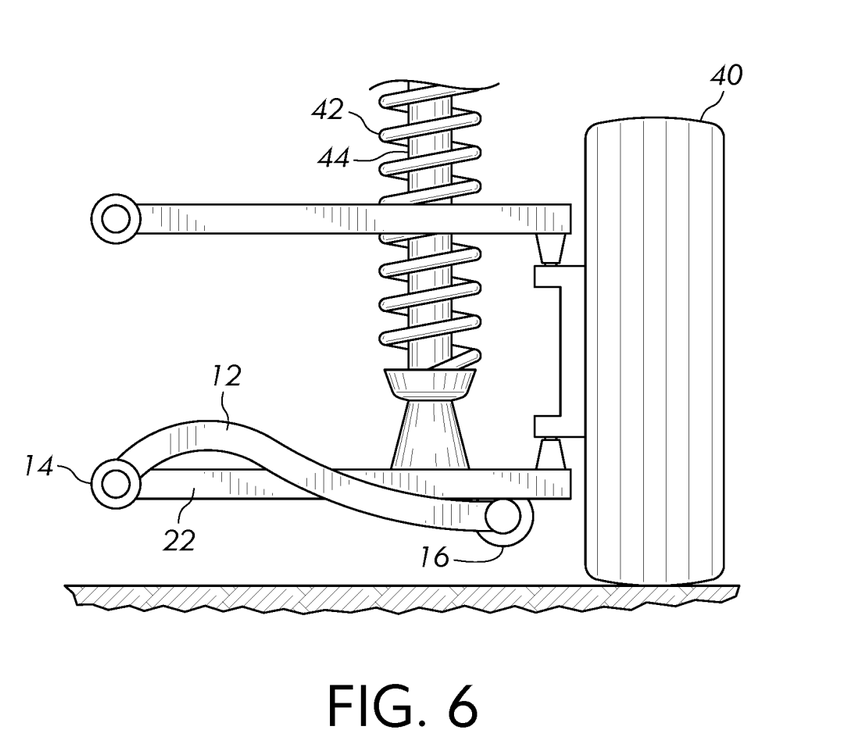
FIG. 6 shows a side view of an add-on or aftermarket version of the system of FIG. 1.
Figure 11A:
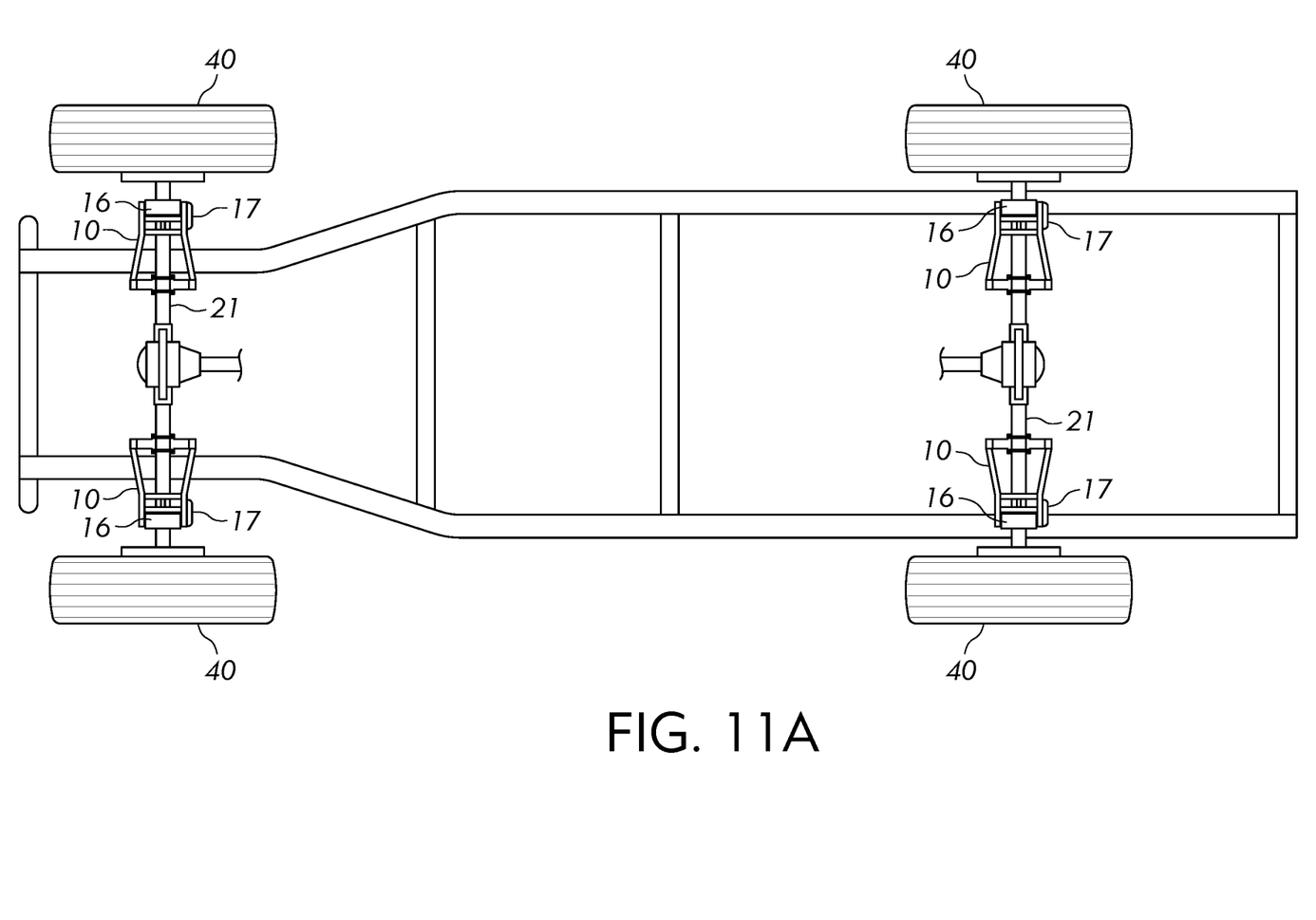
Figure 11B:
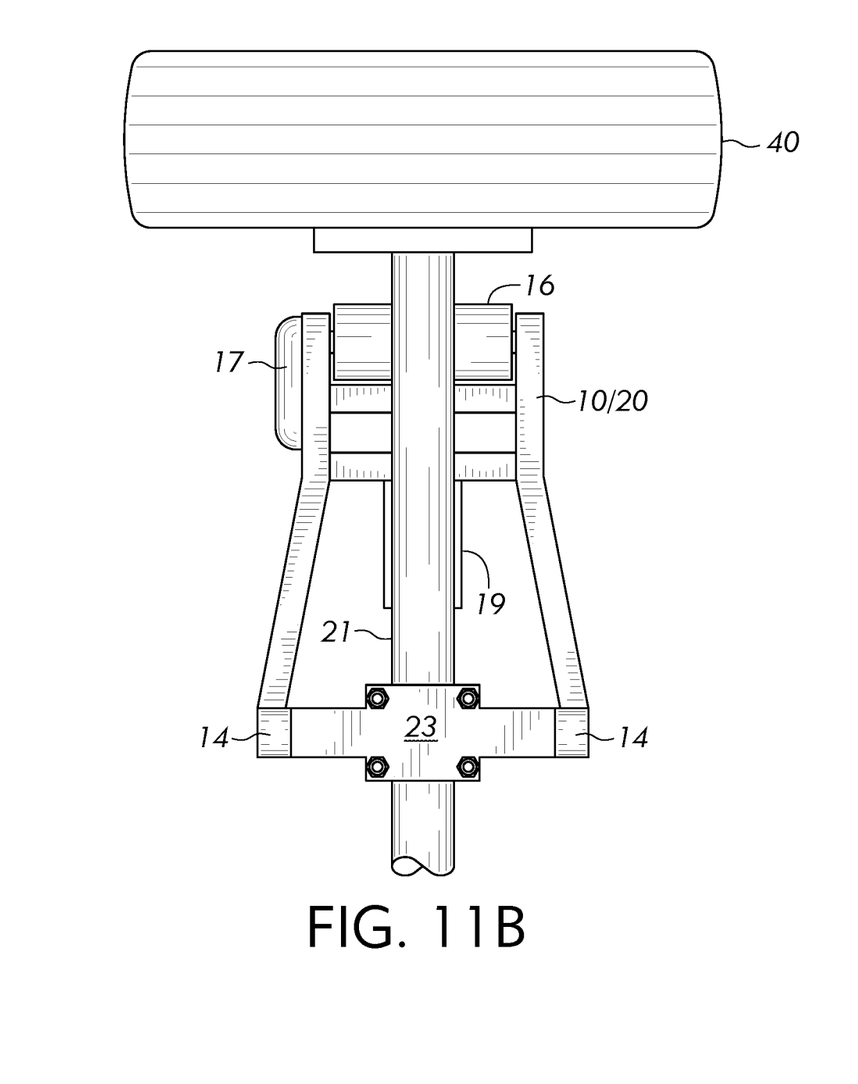
Figure 11C:
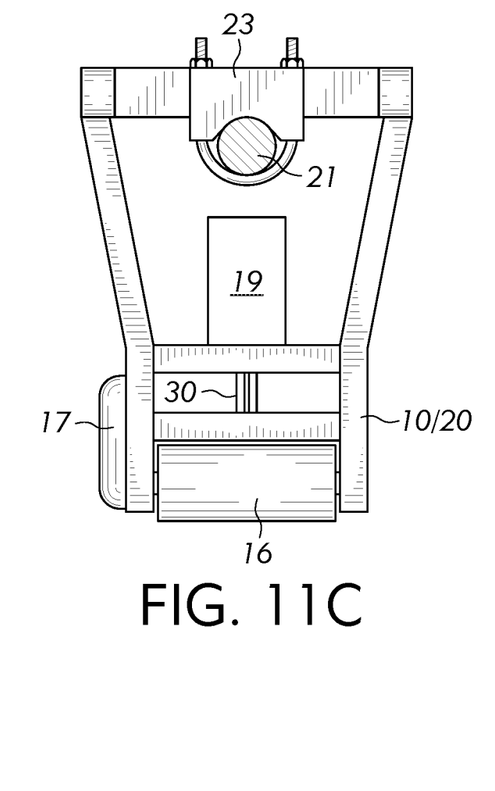

FIGS. 1-4 show an exemplary parking assistance unit 10 mountable to a vehicle frame. The parking assistance unit can also be mounted to a vehicle axle as shown in FIG. 11A-11C. The parking system 10 can be integral as manufactured by a car manufacturer, and the system 10 can also be an add-on or after-market accessory as shown in FIG. 6.

Figure 1:
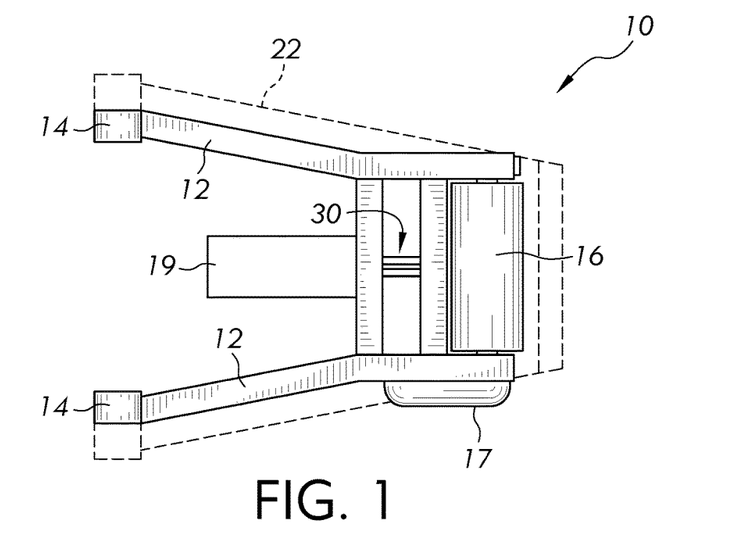
FIG. 1 shows a bottom view of an exemplary parking assistance unit with a parking system deployed.

Turning now to the embodiment of FIG. 1, the parking system 10 is integral to a vehicle with a vehicle frame 14. The parking system 10 includes a two piece control arm 12/22 which includes an outer portion 22 coupled to the frame 14, the outer portion 22 having a control arm wheel receptacle 31. The second half of the control arm is an inner portion 12 hingeably connected to the frame 14. One embodiment, the inner portion 12 is hingeably connected to the outer portion 22 at the frame 14. The inner portion 12 can be used alone as an add-on or after-market accessory. The inner portion 12 has a control arm wheel 16 at a distal end, and the control arm wheel 16 is adapted to be stored in the wheel receptacle 31 when not used. Upon actuation during parking, the control arm wheel 16 is moved or actuated to contact the ground by an actuator, motor or jack motor 19 which is connected to the inner portion 12 to extend a jack 30 and move the control arm wheel 16 from the receptacle to the ground to raise the vehicle off the ground. A wheel motor 17 can be actuated to drive the control arm wheel 16 and move the vehicle into a parking position.

In one embodiment, the wheels are lockable so that the parking assistance unit can only move laterally (or sideways) toward the curb for parking purposes. Should the user desire to move the car forward or backward, the control arm wheels 16 are then unlocked. The unit 10 can also secured to the axle instead of the A-frame as shown in FIG. 11A-11C.

A rotatable jack or expander 30 pushes the lower portion 12 toward the ground until the control arm wheels 16 contact the ground and lift the vehicle off the ground so that it can be easily positioned into a parking position. One embodiment of the expander 30 can be screw operated to move from a flat position into an expanded position. The expander 30 preferably is motorized with motor 19 for automated control, but can also be manually operated.

One embodiment requires the car to be parked before the system can work for safety reasons. When deployed during parking, the control arm wheels 16 are extended to contact the ground and lift the vehicle above ground to move the vehicle into the correct position prior to laterally moving the vehicle into the available parking spot. Once the correct position is achieved, the control arm wheels 16 are locked to allow only lateral movement and the car can be actuated with a motor or manually pushed into the parking position. In this manner, the car can be parked in tight spaces. As shown in FIG. 6, the embodiment of FIG. 1 can have curvilinear arms instead of straight arms 12.

Figure 2A:
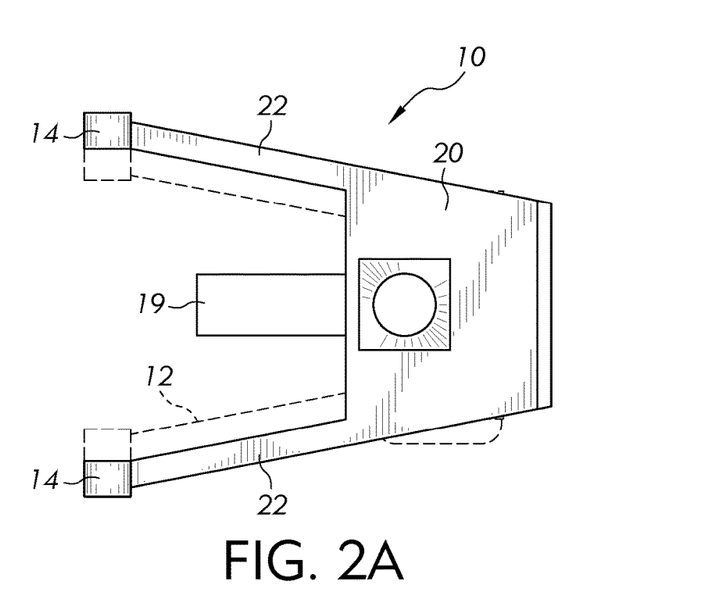
FIGS. 2A and 2B show top and side views of an exemplary parking assistance unit with a parking system in a retracted position for normal driving.
Figure 2B:
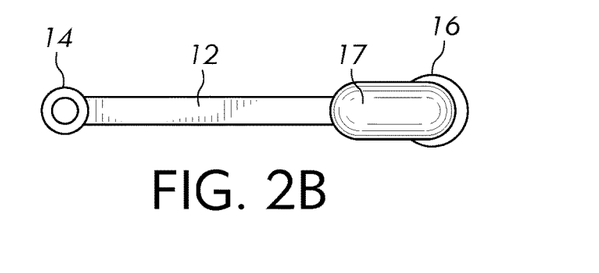

FIG. 2A shows a top view of the unit of FIG. 1, while FIG. 2B shows a side view of an exemplary parking assistance unit with a parking system in a retracted position for normal driving. In use, a driver will position the car near the parking space and line up his/her vehicle adjacent yet behind the vehicle in front of the parking space (on the side away from the curb). Once the vehicle is ready to be pushed toward the curb, the driver parks the vehicle and actuates the parking assistance unit to extend the four wheels toward the pavement and eventually lifting the vehicle above the pavement. The system will then lock the wheels of the parking assistance unit so that the unit can only move sideways toward the curb. Next, the system will actuate the motor in the parking assistance to move sideways into the parking space until the edges of the tires are proximal to or adjacent to the curb.

Figure 3:
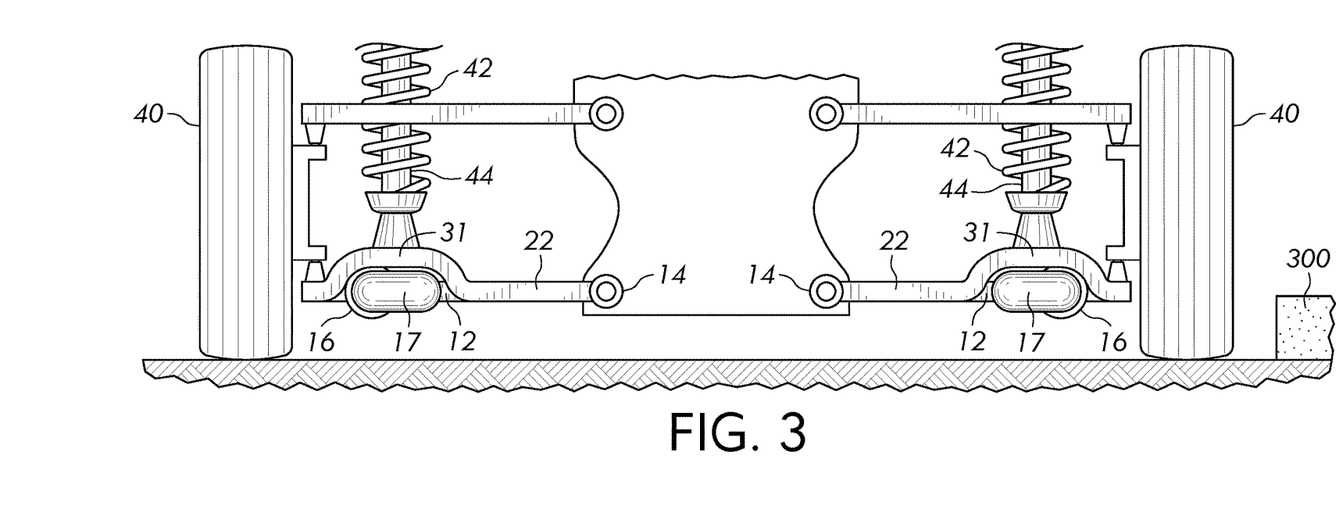
FIGS. 3-4 show side views of the exemplary parking assistance in a retracted position (FIG. 3) and an expanded position (FIG. 4) using an expander 30.
Figure 4:
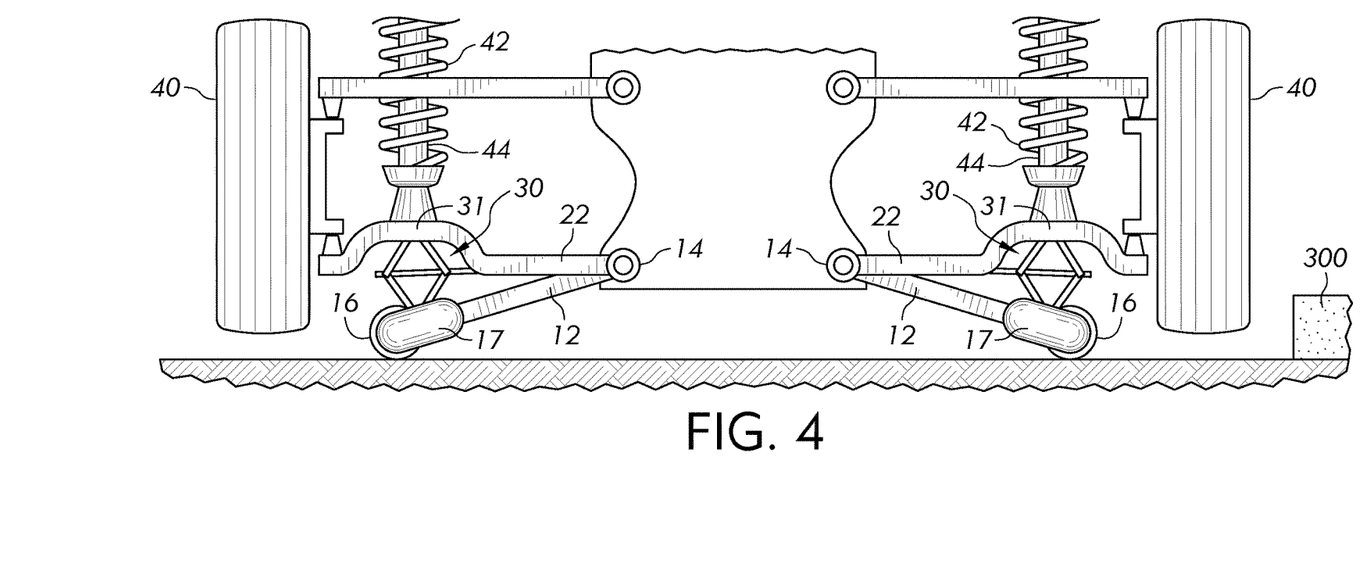

As shown in FIGS. 3-4, the parking assistance unit is secured to the frame of the vehicle or, alternatively, can be secured to a vehicle axle (FIGS. 11A-11C). The jack can be an add-on kit for the vehicle (FIG. 6) or fabricated as an integrated unit of a new vehicle.

FIGS. 3-4 show a bottom view of an exemplary parking assistance unit mounted below the frame of a car in a retracted position (FIG. 3) and an extended position (FIG. 4) using the jack or expander 30 as driven by motor 19. In one embodiment, the vehicle includes a shock absorber 42 positioned around a support rod or strut 44, which in turn is coupled to the jack or expander 30 of the parking assistance unit. FIG. 4 shows the expanded position where control arm wheel 16 contacts the ground and lifts the car up using the jack or expander 30.

Figure 5A:
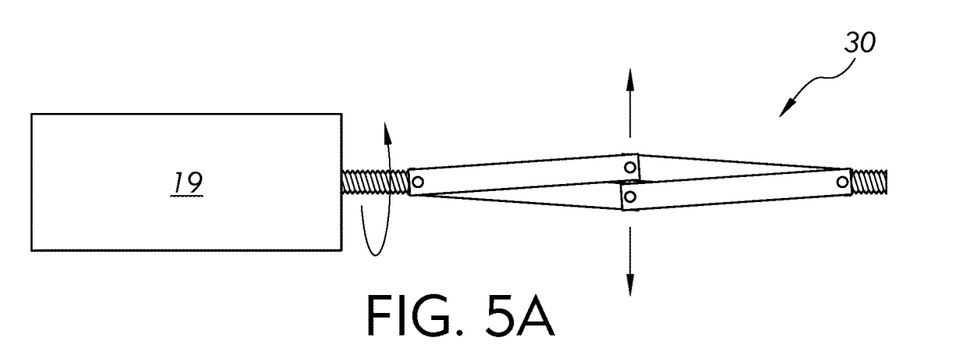
FIGS. 5A-5B show operation of an exemplary jack or expander 30.
Figure 5B:
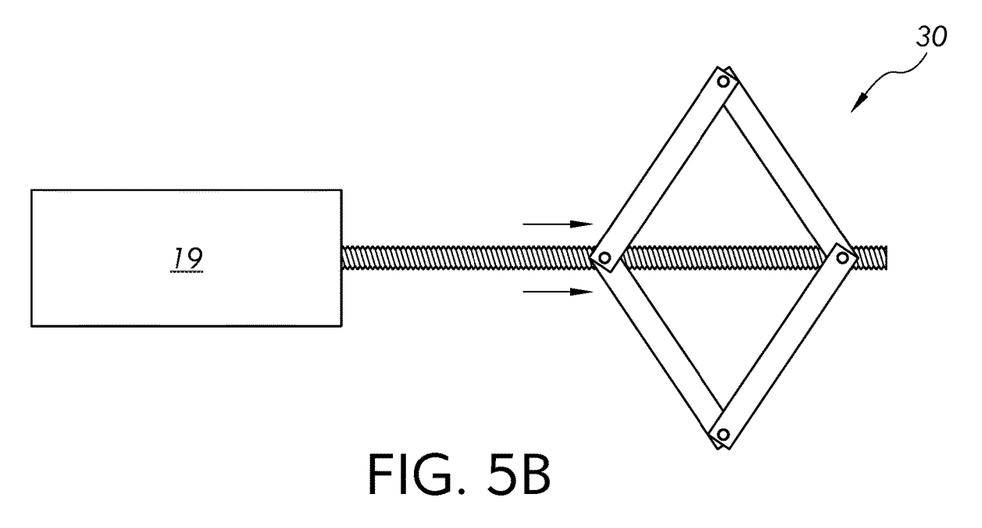

As shown in FIGS. 5A-5B, the jack or expander 30 pushes the lower portion 10 toward the ground until the control arm wheels 16 contact the ground and lifts the vehicle off the ground so that it can be easily positioned into a parking position. FIGS. 5A-5B show one embodiment of an expander 30 which can be motorized (such as motor 19 of FIGS. 7-8), pneumatic, or screw operated to move from a flat position into an expanded position. While a motor 5 discussed for jack activation, the jack 30 can also be moved by an inflatable balloon or suitable hydraulic actuators. The jack or expander 30 can also be manually operated.

In one embodiment, the jack includes a main cylinder having a slidable piston disposed therein; a locking solenoid mounted to each jack for locking the jack in place after the jack has been disposed to the use position for raising the automotive vehicle adjacent that respective wheel; a plurality of secondary solenoids with each secondary solenoid mounted to the frame underside adjacent each jack to assist in controlling the extension of each jack to the use position and the retraction of each jack to the folded, storage position; a hydraulic system for supplying hydraulic fluid to the main cylinders of the jacks after each respective jack has been disposed to the use position so that the jacks can actuate the raising and lowering of the automotive vehicle; the hydraulic system including a fluid reservoir in communication with an electric pump and hydraulic lines extending from the pump and reservoir to each jack; a plurality of leak detection sensors with each leak detection sensor coupled to each jack for detecting the occurrence of a hydraulic fluid leak associated with that respective jack and in the hydraulic system.

In another embodiment, the actuator 19 can be linear motor having a slidable piston disposed therein and disposed to the use position for raising the automotive vehicle adjacent that respective wheel. The system can include a plurality of secondary solenoids with each secondary solenoid mounted to the wheel to specify a predetermined direction of wheel movement.

FIG. 6 shows another embodiment of FIGS. 3-4 with curvilinear arms 12 instead of straight arms 12. The embodiment of FIG. 6 can be sold as an after-market accessory to update a vehicle to provide parking capability.

Figure 7:
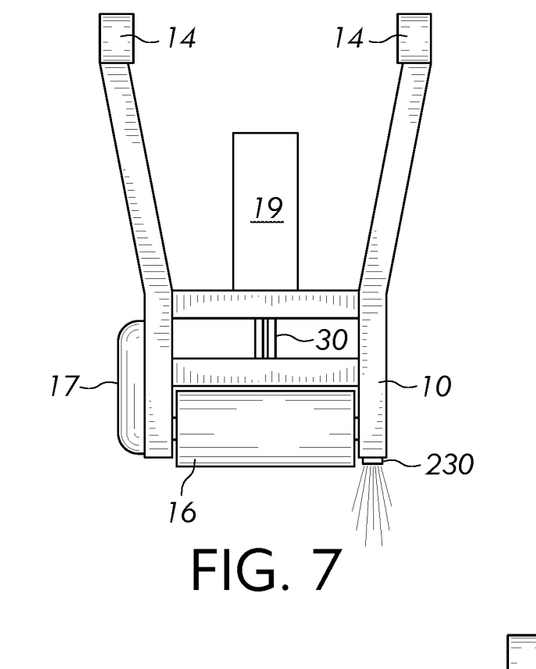
FIG. 7 shows a view of the parking system with a motor and a sensor to determine proximity to a curb.
Figure 8:
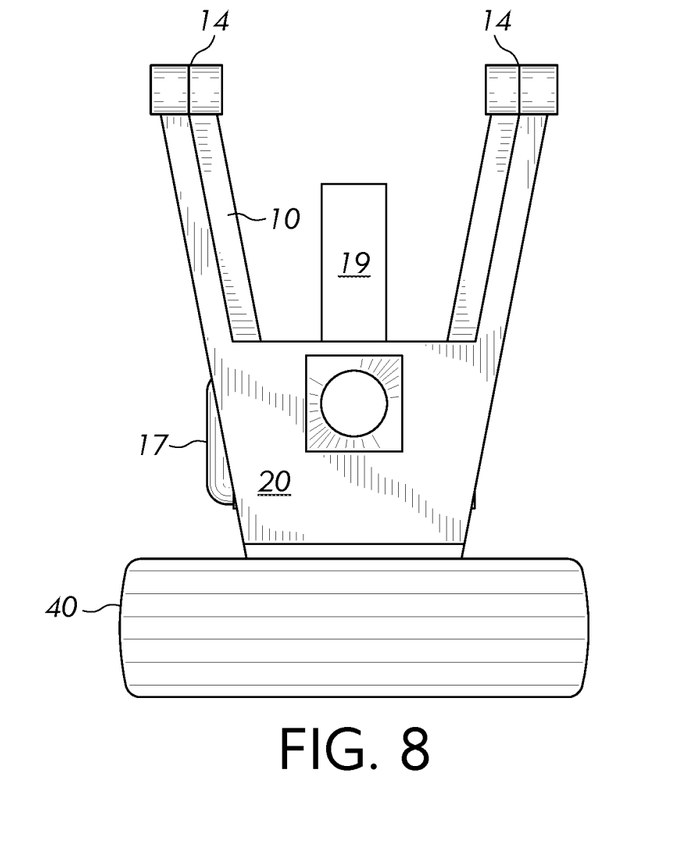
FIG. 8 shows a corresponding top view of the motor mounted on the parking system.

FIGS. 7-12 show additional views of an exemplary parking system with computer control of actuators to park a vehicle. FIG. 7 shows a bottom view of the parking system with jack motor 19, wheel motor 17 and a suitable sensor to determine proximity to a curb, while FIG. 8 shows a corresponding top view of the parking system of FIG. 7.

Figure 9:
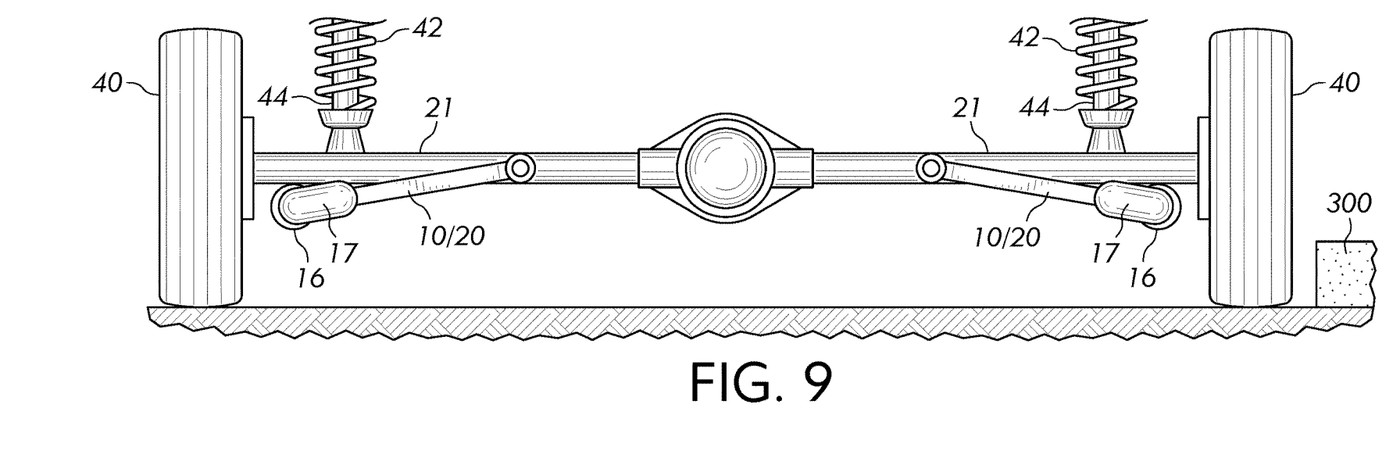
FIGS. 9, 10 and 11A-11C illustrate the operation of the expander on a vehicle axle.
Figure 10:
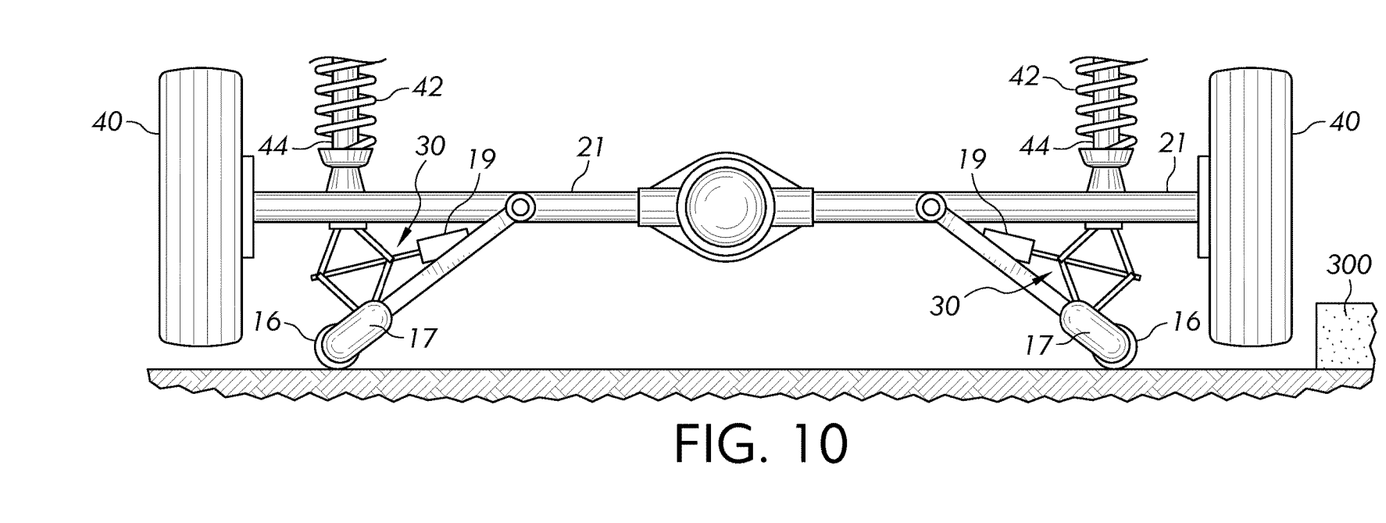

The system of FIGS. 9-10 includes a vehicle lift with jacks 30 each having a control arm wheel 16 and mounted to a vehicle axle, wherein the jacks are operable between a retracted position (FIG. 9) permitting the vehicle to move in a normal fashion, and an extended position (FIG. 10) effective to raise the entire vehicle off the ground to allow the wheels move the vehicle into the parking position. The wheel 16 can be locked to move only in predetermined direction, and automatic means with a processor and motor for locking the jack's wheel in its extended position. The system includes a curb sensor 17 to detect car position relative to a curb 300. The motor 19 is provided to drive the jack 30 from the retracted position to the extended position, and a jack wheel motor 17 is used to drive the jack wheel to park the vehicle adjacent the curb. The system includes a processor 200 (FIG. 12) receiving the car position from the curb sensor, the processor controlling the jack motor to move the jack to the extended position, the processor further controlling the jack wheel motor to drive the jack wheel and park the vehicle.

FIG. 11A shows an exemplary system operable with a vehicle axle 21, while FIGS. 11B-11C show in more details in the embodiment of FIG. 11A. As shown therein, the units can be bolted onto the vehicle axle with a U-bolt. Further, as shown in FIGS. 11B and 11C, the vehicle axle 21 is connected to vehicle wheels 40. A control arms 10/20 have a first end with a control arm wheel 16 and a second end 23 securely mounted to the axle 21 using suitable U-bolts in one embodiment. In this embodiment, the control arm wheel 16 is driven by a motor 17 (FIG. 11B). An actuator 19 is connected to the axle 21 and the control arms 10/20. The actuator 19 can be a motor that drives the control arm wheel 16 between a retracted position permitting the vehicle to be driven, and an extended position where the control arm wheel 16 contacts the ground to raise the vehicle wheel 40 off the ground to allow the control arm wheel 16 to move the vehicle into a parking position.

While two control arm wheels 16 with motors can be used in one embodiment, four control arm wheels 16 preferably contact the ground to move the vehicle. The parking system for the vehicle thus includes a vehicle lift with jacks each having a jack wheel and mounted to a vehicle frame, wherein the jacks are operable between a retracted position permitting the vehicle to move in a normal fashion, and an extended position effective to raise the entire vehicle off the ground to allow the wheels move the vehicle into the parking position, wherein the jack wheels can be locked to move only in predetermined direction, and automatic means for locking the jack's wheel in its extended position. The system includes a curb sensor to detect car position relative to a curb; a jack motor to drive the jack from the retracted position to the extended position; a jack wheel motor to drive the jack wheel to park the vehicle adjacent the curb; and a processor receiving the car position from the curb sensor, the processor controlling the jack motor to move the jack to the extended position, the processor further controlling the jack wheel motor to drive the jack wheel and park the vehicle. In one implementation, the jack is secured to an A-frame of the vehicle or a vehicle axle. In another implementation, the jack is an add-on kit for the vehicle or fabricated as an integrated unit of a vehicle.

Figure 12:
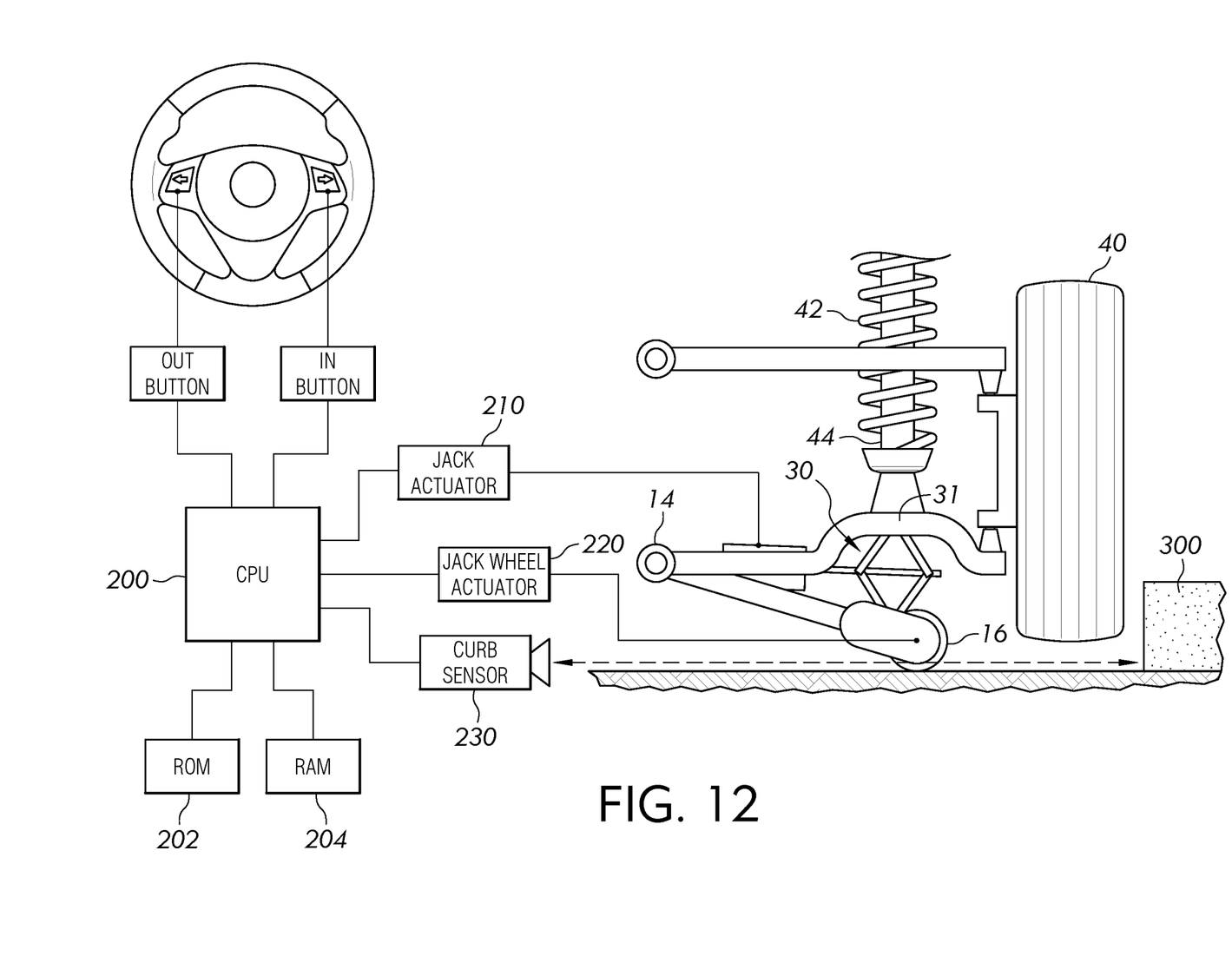
FIG. 12 shows an exemplary computer controlled parking assistance system.

FIG. 12 shows an exemplary computer controlled car parking processing system. The system includes a CPU 200 receiving data from ROM 202 and RAM 204. The CPU 200 controls a jack actuator 210 that drives the jack expander 30. The CPU 200 also controls a jack wheel actuator 220 that rotates the control arm wheel 16. The CPU 200 detects vehicle position relative to a curb 300 using a curb sensor 230 and positions the car so that the tire 40 is positioned adjacent the curb 300 when parking is completed. In and Out buttons are provided on a steering wheel so that a driver can park the vehicle with ease. In one embodiment, when the driver pushes the in button, the vehicle automatically detects the curb and moves the vehicle toward the curb, and when the Out button is pushed, the vehicle moves away from the curb and ready for driving. In another embodiment, sensors on the rear wheels and front wheels detect the total space available for parking. If there is insufficient space, the processor 200 would reject a parking command. If there is sufficient space, the processor determines the available inter-vehicle distance and parks the vehicle to provide an even distance between the vehicle and other parked vehicles in the front and rear of the vehicle. In one embodiment, the user can override the processor 200 and manually park the car using the In/Out buttons.

The curb sensor 230 can be a proximity sensor which can detect the presence of nearby objects with or without any physical contact. Contact sensor can be a touch switch that is closed when the tire 40 is proximal to the curb 300.

Alternatively, a non-contact proximity sensor often emits an electromagnetic field or a beam of electromagnetic radiation (infrared, for instance), and looks for changes in the field or return signal. The object being sensed is often referred to as the proximity sensor's target. Different proximity sensor targets demand different sensors. For example, a capacitive or photoelectric sensor might be suitable for a plastic target; an inductive proximity sensor requires a metal target in the curb. The sensor can be based on capacitive, capacitive displacement, Doppler effect (sensor based on effect), Eddy-current, inductive, laser rangefinder, magnetic, including Magnetic proximity fuse, passive optical (such as charge-coupled devices), passive thermal infrared, photocell (reflective), radar, reflection of ionising radiation, sonar (typically active or passive), ultrasonic sensor (sonar which runs in air), fiber optics sensor, or Hall effect sensor, among others.

The curb sensor 230 can be a proximity sensor which can detect the presence of nearby objects with or without any physical contact. Contact sensor can be a touch switch that is closed when the tire 40 touches the curb 300. Alternatively, a non-contact proximity sensor often emits an electromagnetic field or a beam of electromagnetic radiation (infrared, for instance), and looks for changes in the field or return signal. The object being sensed is often referred to as the proximity sensor's target. Different proximity sensor targets demand different sensors. For example, a capacitive or photoelectric sensor might be suitable for a plastic target; an inductive proximity sensor requires a metal target in the curb. The sensor can be based on capacitive, capacitive displacement, Doppler effect (sensor based on effect), Eddy-current, inductive, laser rangefinder, magnetic, including Magnetic proximity fuse, passive optical (such as charge-coupled devices), passive thermal infrared, photocell (reflective), radar, reflection of ionising radiation, sonar (typically active or passive), ultrasonic sensor (sonar which runs in air), fiber optics sensor, or Hall effect sensor, among others.

To provide automatic parking, the processor can be connected to a curb sensor to detect car position relative to a curb. The curb sensor comprises a proximity sensor, a sound-based sensor, a sonar, or a light-based sensor. In one embodiment with the curb sensor to detect car position relative to a curb, the system provides a jack motor to drive the jack from the retracted position to the extended position; a jack wheel motor to drive the jack wheel to park the vehicle adjacent the curb; and a processor receiving the car position from the curb sensor, the processor controlling the jack motor to move the jack to the extended position, the processor further controlling the jack wheel motor to drive the jack wheel and park the vehicle. FIG. 3 shows the parking assistance unit mounted to a vehicle frame with a shock absorber 44 mounted on a shaft 42 that in turn seats on a drive train assembly supported by one or more tires 40. During travel, the parking assistance unit is secured to the car with the jack wheels in a retracted position as shown in FIG. 2. The control arm wheel 16 can be locked to move only in predetermined direction, and automatic means with a processor and motor for locking the jack's wheel in its extended position. The system includes a curb sensor 230 to detect car position relative to a curb 300. A jack motor is provided to drive the jack from the retracted position to the extended position, and a jack wheel motor is used to drive the jack wheel to park the vehicle adjacent the curb. The system includes a processor 200 (FIG. 14) receiving the car position from the curb sensor, the processor controlling the jack motor to move the jack to the extended position, the processor further controlling the jack wheel motor to drive the jack wheel and park the vehicle into the parking position.

The parking system for the vehicle thus includes a vehicle lift with jacks each having a jack wheel and mounted to a vehicle frame, wherein the jacks are operable between a retracted position permitting the vehicle to move in a normal fashion, and an extended position effective to raise the entire vehicle off the ground to allow the wheels move the vehicle into the parking position, wherein the jack wheels can be locked to move only in predetermined direction, and automatic means for locking the jack's wheel in its extended position. The system includes a curb sensor to detect car position relative to a curb; a jack motor to drive the jack from the retracted position to the extended position; a jack wheel motor to drive the jack wheel to park the vehicle adjacent the curb; and a processor receiving the car position from the curb sensor, the processor controlling the jack motor to move the jack to the extended position, the processor further controlling the jack wheel motor to drive the jack wheel and park the vehicle. In one implementation, the jack is secured to an A-frame of the vehicle or a vehicle axle. In another implementation, the jack is an add-on kit for the vehicle or fabricated as an integrated unit of a vehicle.

In one embodiment, the expander 30 can be motorized or can use a hydraulic system for supplying hydraulic fluid to the main cylinders of the jacks after each respective jack has been disposed to the use position so that the jacks can actuate the raising and lowering of the automotive vehicle. The hydraulic system including a fluid reservoir in communication with an electric pump and hydraulic lines extending from the pump and reservoir to each jack; a plurality of leak detection sensors with each leak detection sensor coupled to each jack for detecting the occurrence of a hydraulic fluid leak associated with that respective jack and in the hydraulic system; a control panel electrically interconnected to the jacks, the locking solenoids, the secondary solenoids, the electric pump and the leak detection sensors and having an electrical cord of a length to allow an individual to move about the automotive vehicle to monitor the operation of the jacks during the raising and lowering of the automotive vehicle; and a control panel including four control switches with each control switch coupled to each jack for controlling the disposition of the jacks from the folded position to the use position, an up/down switch for initiating the extension and retraction of the piston for raising and lowering the automotive vehicle, and a locking switch for actuation of the locking solenoid to lock the jack in place after the extension of the piston to raise the automotive vehicle.

The system may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself. For the convenience of the reader, the above description has focused on a representative sample of all possible embodiments, a sample that teaches the principles of the invention and conveys the best mode contemplated for carrying it out. The description has not attempted to exhaustively enumerate all possible variations. For example, although the parking indicator is shown in the figures as being installed on a car, it should be understood that the parking indicator may also be installed on a truck or a bus in the manner described above. Other undescribed variations or modifications may also be possible. For example, where multiple alternative embodiments are described, in many cases it will be possible to combine elements of different embodiments, or to combine elements of the embodiments described here with other modifications or variations that are not expressly described.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

While certain novel features of this invention have been shown and described, it will be understood that numerous modifications, variations, and alterations are both possible and practicable by those skilled in the art without departing from the spirit of the invention and the scope of the appended claims.

What is claimed is:

1. A parking system for a vehicle, comprising:
    at least one jack having a two piece control arm including:
        an outer portion coupled to a vehicle frame, the outer portion having a control arm wheel receptacle; and
        an inner portion hingeably coupled to the frame and having a movable control arm wheel; and
        an actuator coupled to one of the inner portion or the outer portion to move the inner portion relative to the outer portion.

2. The system of claim 1, wherein the control arm wheel is configured to move only in a predetermined direction, and automatic means for locking the wheel in an extended position.

3. The system of claim 1, comprising wherein the actuator comprises manual spring load, electrical motor, inflatable balloon, or hydraulic jacks.

4. The system of claim 1, wherein the control arm is mounted to the vehicle frame underside of the vehicle adjacent the vehicle's wheels.

5. The system of claim 1, wherein the actuator includes a linear motor having a slidable piston disposed therein for raising the vehicle adjacent that respective wheel in an extended position.

6. The system of claim 1, comprising wherein the at least one jack further comprises two jacks.

7. The system of claim 1, comprising a steering wheel with a plurality of buttons to control vehicular parking.

8. The system of claim 1, comprising a curb proximity sensor and a plurality of vehicle proximity sensors to detect vehicles in front of and behind the vehicle.

9. The system of claim 1, wherein the inner portion is coupled to the control arm wheel at a distal end, the control arm wheel adapted to be stored in the control arm wheel receptacle and upon actuation, the control arm wheel being moveable toward the ground.

10. The system of claim 1, comprising a dashboard mounted control panel to for activating the control arm wheel.

11. The system of claim 1, comprising computer readable medium to determine a distance between a front parked car and a rear parked car and park the vehicle in between.

12. The system of claim 1, wherein the jack is an add-on kit for the vehicle or fabricated as an integrated unit of a vehicle.

13. The system of claim 1, comprising a processor coupled to a motor to drive the control arm wheel.

14. The system of claim 1, comprising a processor coupled to a motor to drive the control arm from the retracted position to the extended position.

15. The system of claim 1, comprising a processor coupled to a curb sensor to detect car position relative to a curb.

16. The system of claim 15, wherein the curb sensor comprises a proximity sensor, a sound-based sensor, a sonar, or a light-based sensor.

17. The system of claim 6, comprising:
    a curb sensor to detect a vehicle position relative to a curb;
    a motor attachable to the control arm wheel;
    a processor receiving the car position from the curb sensor, the processor controlling the actuator to move the control arm to an extended position, the processor further controlling the motor to drive the vehicle to the curb.

18. A parking system for a vehicle, comprising:
    a vehicle lift with a plurality of jacks, each having a jack wheel and mounted to a vehicle frame, wherein the plurality of jacks are operable between a retracted position permitting the vehicle to move in a normal fashion, and an extended position effectively raising the entire vehicle off a ground to allow movement of the vehicle into a parking position, wherein the jack wheels are configured to move only in a predetermined direction, and locks for locking the jack wheels in the extended position;

a curb sensor to detect a vehicle position relative to a curb;

a jack motor to drive the jack from the retracted position to the extended position;

a jack wheel motor to drive the jack wheel to park the vehicle adjacent the curb; and a processor receiving the vehicle position from the curb sensor, the processor controlling the jack motor to move the jack to the extended position, the processor further controlling the jack wheel motor to drive the jack wheel and park the vehicle.

19. A parking system for a vehicle having an axle coupled to vehicle wheels, comprising:

a control arm having a first end with a control arm wheel and a second end mounted to the axle;

a moveable arm interposed between the axle and the control arm wheel; and an actuator coupled to the moveable arm and the control arm, the actuator having an extended position to raise vehicle wheels off a ground to allow the control arm wheel to move the vehicle into a parking position.

20. The system of claim 19, comprising a curb sensor to aid the vehicle during parking proximal to a curb; a motor attachable to the control arm wheel; and a processor receiving the car position from the curb sensor, the processor controlling the actuator to move the control arm to the extended position, the processor further controlling the motor to drive the vehicle to the curb.

* * * * *